(12) United States Patent
Huang et al.

(10) Patent No.: US 11,205,194 B2
(45) Date of Patent: Dec. 21, 2021

(54) RELIABLE USER SERVICE SYSTEM AND METHOD

(71) Applicant: ADVANCED NEW TECHNOLOGIES CO., LTD., Grand Cayman (KY)

(72) Inventors: Hui Huang, Hangzhou (CN); Zhenyu Zhang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/841,418

(22) Filed: Apr. 6, 2020

(65) Prior Publication Data

US 2020/0234333 A1 Jul. 23, 2020

Related U.S. Application Data (63) Continuation of application No. PCT/CN2020/071606, filed on Jan. 12, 2020.

(30) Foreign Application Priority Data

Apr. 30, 2019 (CN) .......................... 201910364877.1

(51) Int. Cl.
*G06Q 30/02* (2012.01)
*H04L 29/08* (2006.01)
(Continued)

(52) U.S. Cl.
CPC ....... *G06Q 30/0255* (2013.01); *H04L 9/0643* (2013.01); *H04L 63/0478* (2013.01); *H04L 67/16* (2013.01)

(58) Field of Classification Search
CPC . G06Q 30/0255; H04L 67/16; H04L 63/0478; H04L 9/0643
See application file for complete search history.

(56) References Cited

U.S. PATENT DOCUMENTS

| 5,937,066 A | 8/1999 | Gennaro et al. |
| 6,775,382 B1 | 8/2004 | Al-Salqan |

(Continued)

FOREIGN PATENT DOCUMENTS

| CN | 102119506 A | 7/2011 |
| CN | 108306891 A | 7/2018 |

(Continued)

OTHER PUBLICATIONS

Written Opinion and International Search Report for PCT Application No. PCT/CN2020/071606 dated Nov. 5, 2020.

(Continued)

*Primary Examiner* — Mohammad A. Nilforoush
*Assistant Examiner* — Cristina Owen Sherr (57) ABSTRACT

A method includes sending an encrypted first hash value set to a data provider; receiving an encrypted second hash value set and a double-encrypted first hash value set from the data provider; re-encrypting the received encrypted second hash value set to obtain a double-encrypted second hash value set; calculating an intersection of the double-encrypted first hash value set and the double-encrypted second hash value set to determine one or more shared users shared with the data provider; and recommending or providing a service to the one or more shared users.

17 Claims, 4 Drawing Sheets

(51) Int. Cl.
*H04L 9/06* (2006.01)
*H04L 29/06* (2006.01)

(56) References Cited

U.S. PATENT DOCUMENTS

| | | | |
|---|---|---|---|
| 6,912,285 | B2 | 6/2005 | Jevans |
| 7,634,659 | B2 | 12/2009 | Fahrny |
| 7,860,241 | B2 | 12/2010 | Hall et al. |
| 7,925,009 | B2 | 4/2011 | Schneider |
| 8,009,829 | B2 | 8/2011 | Jueneman et al. |
| 8,189,769 | B2 | 5/2012 | Ramasamy et al. |
| 8,281,122 | B2 | 10/2012 | Durham et al. |
| 8,358,781 | B2 | 1/2013 | Schneider |
| 8,375,420 | B2 | 2/2013 | Farrell et al. |
| 8,416,947 | B2 | 4/2013 | Schneider |
| 8,417,936 | B2 | 4/2013 | Iwao et al. |
| 8,767,959 | B2 | 7/2014 | Relyea et al. |
| 9,116,849 | B2 | 8/2015 | Nayshtut et al. |
| 9,374,373 | B1 | 6/2016 | Chan et al. |
| 10,015,159 | B2 | 7/2018 | Toyonaga et al. |
| 10,027,486 | B2 | 7/2018 | Liu |
| 2010/0268960 | A1 | 10/2010 | Moffat et al. |
| 2011/0271093 | A1 | 11/2011 | Mckenna |
| 2011/0296176 | A1* | 12/2011 | Ashrafi ................. G06F 21/64 713/167 |
| 2013/0198513 | A1 | 8/2013 | Kim |
| 2013/0246790 | A1 | 9/2013 | Wang |
| 2015/0082054 | A1 | 3/2015 | Nosko et al. |
| 2015/0249918 | A1 | 9/2015 | Li |
| 2016/0078431 | A1 | 3/2016 | Ramachandran et al. |
| 2016/0119291 | A1 | 4/2016 | Zollinger et al. |
| 2018/0191495 | A1 | 7/2018 | Miller et al. |
| 2018/0254893 | A1* | 9/2018 | Saxena ................. H04L 9/0838 |
| 2018/0278414 | A1 | 9/2018 | Vanek et al. |

FOREIGN PATENT DOCUMENTS

| | | |
|---|---|---|
| CN | 108805598 A | 11/2018 |
| CN | 108811519 A | 11/2018 |
| CN | 109325357 A | 2/2019 |
| CN | 110086817 A | 8/2019 |

OTHER PUBLICATIONS

First Search for Chinese Application No. 201910364877.1 dated Jan. 22, 2021.
Search Report for Taiwanese Application No. 109100733 dated Aug. 25, 2020.
Supplementary Search for Chinese Application No. 201910364877.1 dated Jun. 28, 2021.

* cited by examiner

RELIABLE USER SERVICE SYSTEM AND METHOD

CROSS REFERENCE TO RELATED APPLICATIONS

This application is a continuation application of International Application No. PCT/CN2020/071606, filed on Jan. 12, 2020, which claims priority to and benefits of Chinese Patent Application No. 201910364877.1 filed on Apr. 30, 2019. The contents of the above-referenced applications are incorporated herein by reference in their entirety.

TECHNICAL FIELD

The present invention relates to a reliable user service system and method.

BACKGROUND

In the big data era, in order to improve services for users, it is usually necessary to undertake a data exchange with other organizations so as to recommend or provide more desirable services to new users and existing users. For example, in a big data scenario, a service provider (i.e., a data demander) can identify, through the collaboration with a data provider and user matching, users owned by the data provider that are new customers of the service provider and users that are shared by the two parties, thereby precisely pinpointing potential new users and existing users. The service provider can adaptively recommend or provide the most desirable services to these users.

Moreover, in the big data era, in order to better depict and understand user preferences or risks, the data demander usually needs supplements from external data. Therefore, the data demander also needs to perform data matching with the data provider to identify users shared by the two parties.

Conventionally, the two data collaboration parties need to perform user matching in a centralized manner. Currently, the following three conventional solutions are available:

Solution 1: one party sends its data to the other party to complete matching.

Solution 2: the two parties complete matching in a reliable lab environment.

Solution 3: the two parties encrypt their respective data, and another other party performs user matching by calling an interface.

However, with the promulgation of laws for privacy protection and the increase user awareness of privacy protection, neither the data demander nor the data provider wants to provide their user data to the other party for data matching. Solution 1 and solution 2 cannot meet this requirement; and for solution 3, data is easily subject to rainbow table attacks from another party, resulting in leakage of all user data.

Therefore, a reliable solution for performing user matching without data breach from either party is urgently needed.

SUMMARY

According to one aspect of this specification, a reliable user service method is provided, comprising: sending an encrypted first hash value set to a data provider; receiving, from the data provider, an encrypted second hash value set and a double-encrypted first hash value set; re-encrypting the received encrypted second hash value set using a first key to obtain a double-encrypted second hash value set; calculating an intersection of the double-encrypted first hash value set and the double-encrypted second hash value set so as to determine one or more users shared with the data provider; and recommending or providing a service to the one or more shared users.

In one embodiment, the encrypted first hash value set is obtained by: applying a hash function to a first data set comprising one or more first user identifiers to generate a first hash value set corresponding to the first data set; and encrypting the first hash value set using the first key to obtain the encrypted first hash value set.

In another embodiment, the encrypted second hash value set is generated by the data provider applying a hash function to a second data set and using a second key for encryption, wherein the second data set comprises one or more second user identifiers.

In still another embodiment, the double-encrypted first hash value set is obtained by the data provider encrypting the encrypted first hash value set using the second key.

In still another embodiment, the second data set further comprises one or more user-associated second attributes other than the user identifiers, wherein the recommending or providing a service to the one or more shared users comprises: requesting, from the data provider, the one or more second attributes associated with the one or more shared users in the second data set; after receiving the one or more second attributes associated with the one or more shared users, generating association relationship by associating each of the second attributes with a corresponding user identifier in the first data set; and recommending or providing a service to a corresponding user based on the association relationship.

In still another embodiment, the one or more shared users correspond to an intersection of the first data set and the second data set, and the method further comprises receiving, from the data provider, a third data set including the second data set minus the intersection with the first data set.

In still another embodiment, the method further comprises requesting, from the data provider, other user identifiers in the third data set.

In still another embodiment, the method further comprises sending an identifier associated with the one or more shared users to the data provider, so that the data provider can determine other user identifiers in the third data set.

In yet still another embodiment, the method further comprises recommending or providing a basic-level service to users corresponding to the other user identifiers.

In still another embodiment, the method further comprises identifying similar users by comparing the third data set with the first data set, wherein the similar users are users having one or more similar or same attributes in the third data set and the first data set; and recommending or providing a service to a similar user in the third data set based on a service of a user in the first data set.

In still another embodiment, based on the association relationship, a higher-level service is recommended to or an existing service is adjusted for a corresponding user.

In still another embodiment, elements in the first data set comprise one or more first attributes other than the user identifiers; the one or more first attributes are the same as or different from the one or more second attributes; and the association relationship comprises: for the second attributes different from the first attributes, using the second attributes as new attributes and associating the same with a corresponding user identifier in the first data set; and for the second attributes that are the same as the first attributes, using the second attributes as parallel or alternative attributes of the first attributes and associating the same with a corresponding user identifier in the first data set.

According to another aspect of this specification, a reliable user service system is provided, comprising: a transmitting component, configured to send an encrypted first hash value set to a data provider; a receiving component, configured to receive, from the data provider, an encrypted second hash value set and a double-encrypted first hash value set; an encrypting component, configured to re-encrypt the received encrypted second hash value set using a first key to obtain a double-encrypted second hash value set; a calculating component, configured to calculate an intersection of the double-encrypted first hash value set and the double-encrypted second hash value set so as to determine one or more users shared with the data provider; and a service component, configured to recommend or provide a service to the one or more shared users.

In one embodiment, the encrypted first hash value set is obtained as follows: the calculating component applies a hash function to a first data set comprising one or more first user identifiers to generate a first hash value set corresponding to the first data set; and the encrypting component encrypts the first hash value set using the first key to obtain the encrypted first hash value set.

In another embodiment, the encrypted second hash value set is generated by the data provider applying a hash function to a second data set to generate a second hash value set and encrypting the second hash value set using a second key, wherein the second data set comprises one or more second user identifiers.

In still another embodiment, the double-encrypted first hash value set is obtained by the data provider encrypting the encrypted first hash value set using the second key.

In still another embodiment, the second data set further comprises one or more user-associated second attributes other than the user identifiers, wherein the service component recommends or provides a service to the one or more shared users comprises: the transmitting component requests, from the data provider, the one or more second attributes associated with the one or more shared users in the second data se; after the receiving component receives the one or more second attributes associated with the one or more shared users, the calculating component associates each of the second attributes with a corresponding user identifier in the first data set; and the service component recommends or provides a service to a corresponding user based on the association relationship.

In still another embodiment, based on the association relationship, the service component recommends a higher-level service to or adjusts an existing service for a corresponding user.

In yet still another embodiment, the one or more shared users correspond to an intersection of the first data set and the second data set; and the receiving component is further configured to receive, from the data provider, a third data set including the second data set minus the intersection with the first data set.

In still another embodiment, the service component recommends or provides a basic-level service to users corresponding to the other user identifiers.

In still another embodiment, the calculating component identifies similar users by comparing the third data set with the first data set, wherein the similar users are users having one or more similar or same attributes in the third data set and the first data set; and the service component recommends or provides a service to a similar user in the third data set based on a service of a user in the first data set.

According to still another aspect of this specification, a reliable user service system is provided, comprising: a processor and a memory configured to store computer-executable instructions; when the executable instructions are executed, the processor is enabled to perform the following operations: sending an encrypted first hash value set to a data provider; receiving, from the data provider, an encrypted second hash value set and a double-encrypted first hash value set; re-encrypting the received encrypted second hash value set using a first key to obtain a double-encrypted second hash value set; calculating an intersection of the double-encrypted first hash value set and the double-encrypted second hash value set so as to determine one or more users shared with the data provider; and recommending or providing a service to the one or more shared users.

In general, each aspect comprises a method, apparatus, system, computer program product, and processing system as basically described in this description with reference to the accompanying drawings and as illustrated in the accompanying drawings.

The foregoing content has generally depicted example features and technical advantages of this specification, thus facilitating better understanding of the detailed descriptions below. Additional features and advantages are described hereinafter. The disclosed concepts and examples can be easily used as a foundation for modifying or designing other structures for achieving the same objectives as this specification. Such equivalent structures do not go beyond the scope of the attached claims. The organization and operation method of the characteristics of the concepts disclosed in this description and related advantages will be better understood considering the following descriptions with reference to the accompanying drawings. Each accompanying drawing is intended for illustrative and descriptive purposes rather than defining the restrictions on the claims.

BRIEF DESCRIPTION OF THE DRAWINGS

The foregoing brief summary can be described in detail with reference to different aspects to facilitate a better understanding of the means used by the above-described features in this specification; and some aspects are illustrated in the accompanying drawings. However, it should be noted that the accompanying drawings illustrate only some typical aspects of this specification and should not be considered as limiting the scope of this specification, for the description may admit to other equally effective aspects. The same reference numerals in different accompanying drawings may identify the same or similar elements.

DETAILED DESCRIPTION OF EMBODIMENTS

Figure 1:
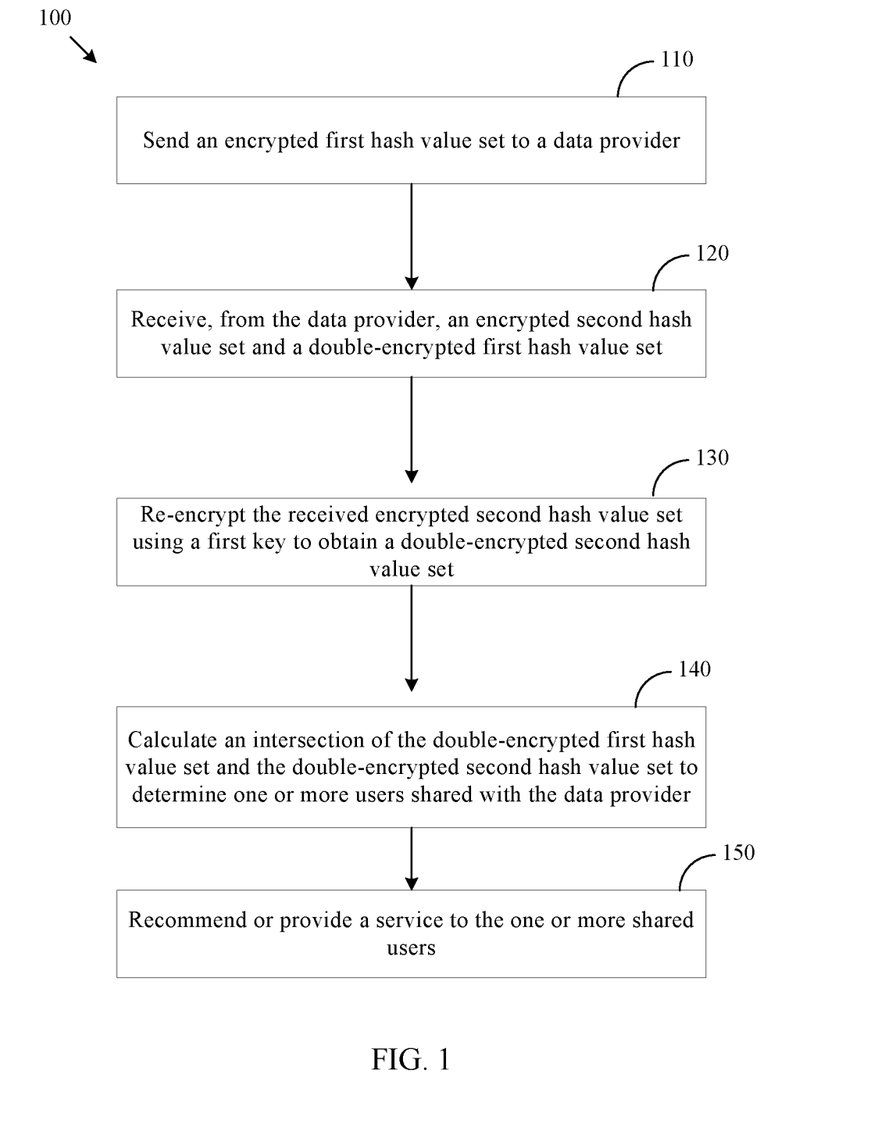
FIG. 1 is a flow chart illustrating an example reliable user service method according to various aspects of this specification.
Figure 2:
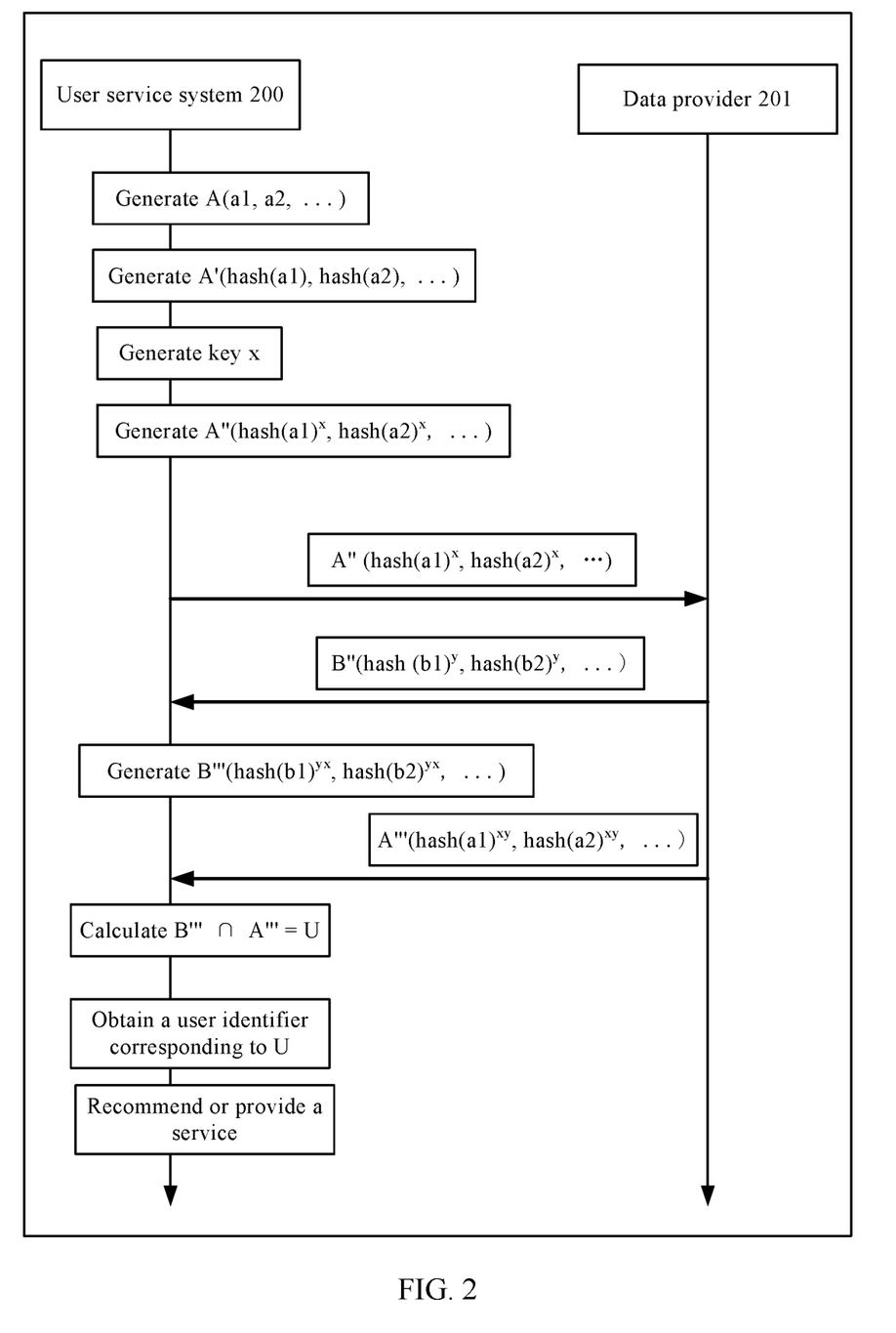
FIG. 2 is a schematic diagram illustrating an operation of an example reliable user service system according to various aspects of this specification.

The following detailed descriptions with reference to FIG. 1 and FIG. 2 are intended for describing various configurations and do not mean to represent exclusive configurations for implementing the concepts described in this description. These detailed descriptions include details to facilitate thorough understanding of various concepts. However, it is obvious to a person of ordinary skill in the art that these concepts can still be implemented without these details.

FIG. 1 is a flow chart illustrating an example reliable user service method 100 according to aspects of this specification; and FIG. 2 is a schematic diagram illustrating an example reliable user service system 200 according to aspects of this specification.

As shown in FIG. 1, in step 110, the method 100 comprises sending an encrypted first hash value set to a data provider (computer or server). For example, referring to FIG. 2, in one embodiment, the user service system 200 may send an encrypted first hash value set A''(hash(a1)$^x$, hash(a2)$^x$, . . . ) to a data provider 201.

In one embodiment, the encrypted first hash value set is obtained by: applying a hash function to a first data set comprising one or more first user identifiers to generate a first hash value set corresponding to the first data set; and encrypting the first hash value set using the first key to obtain the encrypted first hash value set.

For example, referring to FIG. 2, in this embodiment, the user service system 200 may generate a first data set A(a1, a2, . . . ) comprising user identifiers, where a1, a2, and the like represent user identifiers, such as names, ID card numbers, telephone numbers, e-mail addresses, and other information. The user service system 200 then may apply a hash function to the first data set A(a1, a2, . . . ) to generate a first hash value set A'(hash(a1), hash(a2), . . . ) corresponding to the first data set, where hash(a1), hash(a2), and the like represent hash values of a1, a2, and the like. Then, the user service system 200 may generate a first key x, and encrypt the first hash value set A'(hash(a1), hash(a2), . . . ) using the first key x to generate an encrypted first hash value set A''(hash(a1)$^x$, hash(a2)$^x$, . . . ), where hash(a1)$^x$, hash(a2)$^x$, and the like represent encrypted hash values.

In another embodiment, the encrypted first hash value set is calculated in advance and stored in association with a first key in a memory.

In step 120, the method 100 comprises receiving, from the data provider, an encrypted second hash value set and a double-encrypted first hash value set.

In one embodiment, the encrypted second hash value set is generated by the data provider applying a hash function to a second data set to generate a second hash value set and encrypting the second hash value set using a second key, wherein the second data set comprises one or more second user identifiers. For example, referring to FIG. 2, the user service system 200 receives an encrypted second hash value set B''(hash(b1)$^y$, hash(b2)$^y$, . . . ) from the data provider 201, where hash(b1)$^y$, hash(b2)$^y$, and the like represent encrypted hash values obtained by encrypting hash values hash(b1), hash(b2), and the like of elements b1, b2, and the like of a data set B using a second key y; and b1, b2, and the like also represent second user identifiers.

In one embodiment, the double-encrypted first hash value set is obtained by the data provider encrypting the encrypted first hash value set using the second key. For example, referring to FIG. 2, in one embodiment, the user service system 200 may receive a double-encrypted first hash value set A'''(hash(a1)$^{xy}$, hash(a2)$^{xy}$, . . . ) from the data provider 201. The set is obtained after the data provider 201 re-encrypts the encrypted first hash value set A''(hash(a1)$^x$, hash(a2)$^x$ . . . ) using the second key y.

In step 130, the method 100 comprises re-encrypting the received encrypted second hash value set using a first key to obtain a double-encrypted second hash value set. For example, referring to FIG. 2, in one embodiment, the user service system 200 may re-encrypt the received encrypted second hash value set B''(hash(b1)$^y$, hash(b2)$^y$, . . . ) using a first key x to obtain a double-encrypted second hash value set B'''(hash(b1)$^{yx}$, hash(b2)$^{yx}$, . . . ).

In step 140, the method 100 comprises calculating an intersection of the double-encrypted first hash value set and the double-encrypted second hash value set so as to determine one or more users shared with the data provider. For example, referring to FIG. 2, in one embodiment, the user service system 200 may calculate an intersection U of the double-encrypted first hash value set A'''(hash(a1)$^{xy}$, hash(a2)$^{xy}$, . . . ) and the double-encrypted second hash value set B'''(hash(b1)$_{yx}$, hash(b2)$_{yx}$, . . . ). In this way, the user service system 200 can determine a user identifier in the first data set A that corresponds to each double-encrypted hash value in the obtained intersection U, thereby determining one or more users shared with the data provider.

Therefore, the user service system 200 can obtain only the intersection U and restores an original user identifier in the intersection U without knowing the second key y. A rainbow table attack on the data provider 201 is thus not possible. Similarly, the data provider 201 does not know the first key x and therefore cannot initiate a rainbow table attack on the user service system 200. In this way, user identifiers unique to the user service system 200 and the data provider 201 are only known to each party respectively without being leaked.

In step 150, the method 100 comprises recommending or providing a service to the one or more shared users. For example, referring to FIG. 2, in one embodiment, the user service system 200 may recommend or provide a service to a user corresponding to each element in U, for example, to better meet the user requirements.

In one embodiment, the method 100 may further comprise requesting, from the data provider, other user identifiers in a third data set including the second data set minus the data intersecting with the first data set. For example, referring to FIG. 2, the user service system 200 may request, from the data provider 201, user identifiers in the second data set B minus those corresponding to the intersection U. In this example, the user service system 200 may send user identifiers corresponding to the intersection U to the data provider so that the data provider can determine user identifiers other than these identifiers. Further, according to this example, after receiving the other user identifiers, the user service system 200 may recommend or provide a basic-level service to users corresponding to these user identifiers. For example, for the user service system 200, these users are new users without using any services yet. Therefore, the user service system 200 can recommend or provide a basic-level service to these users. In an alternative embodiment, the user service system may provide a service list to these new users so that these new users can choose needed services therefrom.

In another embodiment, the second data set further comprises one or more user-associated second attributes other than the user identifiers. In various embodiments, the step of recommending or providing a service to the one or more shared users comprises: requesting, from the data provider, the one or more second attributes associated with the one or more shared users in the second data set; after receiving the one or more second attributes associated with the one or more shared users, generating association relationship by associating each of the second attributes with a corresponding user identifier in the first data set; and recommending or providing a service to a corresponding user based on the association relationship. For example, referring to FIG. 2, other than the user identifiers, the second data set B further comprises various other characteristic attributes of a user, such as the gender, age, mobile phone type, asset, credit card limit, credit score, and the like. The user service system 200 may receive these attributes and associate them with a corresponding user, thereby obtaining a more comprehensive depiction of the user. Then, the user service system 200 may recommend or provide a service to the user based on the more comprehensive depiction.

In one embodiment, the user service system 200 may compare a user with users in an entire user group of the system to determine which users from the original user group of the system have a similar or same attribute as the user (i.e., the user and these users can be considered as similar users), and recommend or provide a service to the user based on a service for the similar users.

In another embodiment, after an attribute of a shared user is supplemented using the second data set, a user similar to the shared user in an entire user group of the user service system is determined, and an existing service for the shared user is adjusted based on a service for the similar user. For example, at first a user 1 and a user 2 in the user service system 200 enjoy services of different levels; and the user service system 200 has only an identifier of the user 1 but has both identifier and age information of the user 2. After the information of the user 1 is supplemented using data from the other party, the user service system 200 has age information of the user 1. The user service system 200 then discovers through comparison that the user 1 and the user 2 have similar (for example, with a difference within a preset threshold range) or same age information, and thus can provide the user 1 with a service of the same level as that for the user 2.

A person of ordinary skill in the art can understand that this is only an example and multiple alternative solutions fall within the scope of this specification. For example, in one embodiment, multiple pieces of related information of the user 1 may be compared with information of multiple user subgroups in a user group; and a service for a user subgroup having the most similar or same attributes with the user 1 is provided to the user 1. Moreover, different weights may be added to different attributes. For example, a user may have attributes of age and income level, with the income level having a greater weight in determining a service provided to the user. In this way, a user having a similar or same income level takes precedence over a user having a similar or same age and is selected as a similar user so as to determine which service will be provided to the user.

In still another embodiment, elements in the first data set include one or more first attributes in addition to the user identifiers; the one or more first attributes are the same as or different from the one or more second attributes; and the associating comprises: for the second attributes different from the first attributes, using the second attributes as new attributes and associating the same with a corresponding user identifier in the first data set; and for the second attributes that are the same as the of first attributes, using the second attributes as parallel or alternative attributes of the first attributes and associating the same with a corresponding user identifier in the first data set. For example, referring to FIG. 2, the first data set A comprises a mobile phone number attribute, a gender attribute, and a telecommunications service package attribute in addition to the user identifier; and the second data set B comprises an age attribute and a mobile phone number attribute in addition to the user identifier. In this example, the association between the two enables the first data set to comprise the mobile phone number attribute, the gender attribute, the telecommunications service package attribute, and the age attribute; the mobile phone numbers from these two data sets may coexist, or an original mobile phone number may be replaced (or an original mobile phone number may be kept and a new number may be ignored). In this embodiment, based on the association relationship, the user service system 200 may further recommend a higher-level service to or adjust an existing service for a corresponding user. For example, the user service system 200 may recommend or provide a higher-level telecommunications service to the user after the association.

Figure 3:
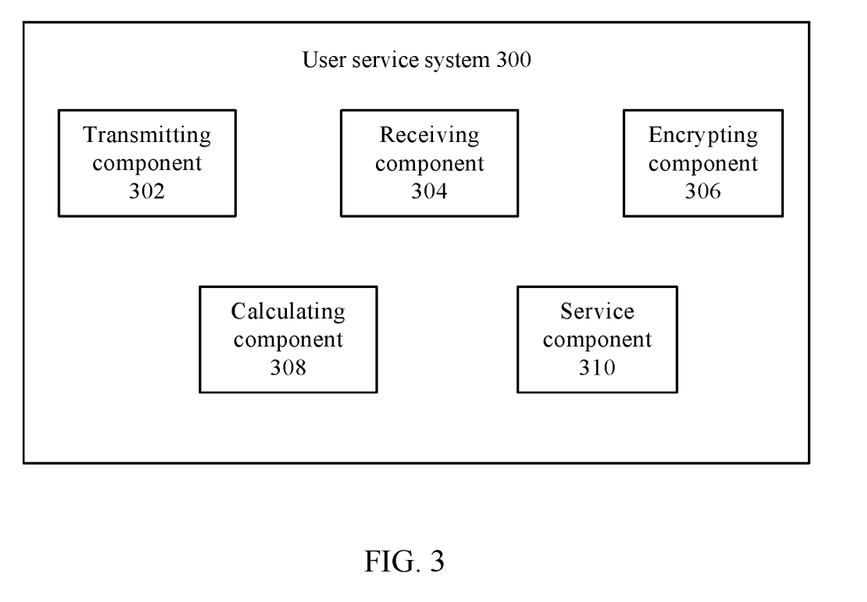
FIG. 3 is a block diagram illustrating components of an example reliable user service system according to various aspects of this specification.

FIG. 3 is a block diagram illustrating components of an example reliable user service system 300 according to aspects of this specification. As shown in FIG. 3, in an example, the user service system 300 comprises a transmitting component 302, a receiving component 304, an encrypting component 306, a calculating component 308, and a service component 310. However, it can be understood that these blocks are merely examples. These components may be combined with one another to form a single component or be split into more components. In addition, the user service system 300 may further comprise other components.

In one embodiment, the transmitting component 302 is configured to send an encrypted first hash value set to a data provider; the receiving component 304 is configured to receive, from the data provider, an encrypted second hash value set and a double-encrypted first hash value set; the encrypting component 306 is configured to re-encrypt the received encrypted second hash value set using a first key so as to obtain a double-encrypted second hash value set; the calculating component 308 is configured to calculate an intersection of the double-encrypted first hash value set and the double-encrypted second hash value set so as to determine one or more users shared with the data provider; and the service component 310 is configured to recommend or provide a service to the one or more shared users.

In one embodiment, the encrypted first hash value set is obtained as follows: the calculating component 308 applies a hash function to a first data set comprising one or more first user identifiers to generate a first hash value set corresponding to the first data set; and the encrypting component 306 encrypts the first hash value set using the first key to obtain the encrypted first hash value set.

In another embodiment, the encrypted second hash value set is generated by the data provider applying a hash function to a second data set to generate a second hash value set and encrypting the second hash value set using a second key, wherein the second data set comprises one or more second user identifiers.

In still another embodiment, the double-encrypted first hash value set is obtained by the data provider encrypting the encrypted first hash value set using the second key.

In yet still another embodiment, the second data set further comprises one or more user-associated second attributes other than the user identifiers; and the service component 310 recommends or provides a service to the one or more shared users comprises: the transmitting component 302 requests, from the data provider, the one or more second attributes associated with the one or more shared users in the second data set; after the receiving component 304 receives the one or more second attributes associated with the one or more shared users, the calculating component 308 associates each of the second attributes with a corresponding user identifier in the first data set; and the service component 310 recommends or provides a service to a corresponding user based on the association.

In still another embodiment, based on the association, the service component 310 recommends a higher-level service to a corresponding user or adjusts an existing service.

In still another embodiment, the one or more shared users correspond to an intersection of the first data set and the second data set; and the receiving component 304 is further configured to receive, from the data provider, a third data set including the second data set minus the intersection with the first data set.

In still another embodiment, the service component 310 recommends or provides a basic-level service to users corresponding to the other user identifiers.

In yet still another embodiment, the calculating component 308 identifies similar users by comparing the third data set with the first data set, wherein the similar users are users having one or more similar or same attributes in the two data sets; and the service component 310 recommends or provides a service to a similar user in the third data set based on a service of a user in the first data set.

Figure 4:
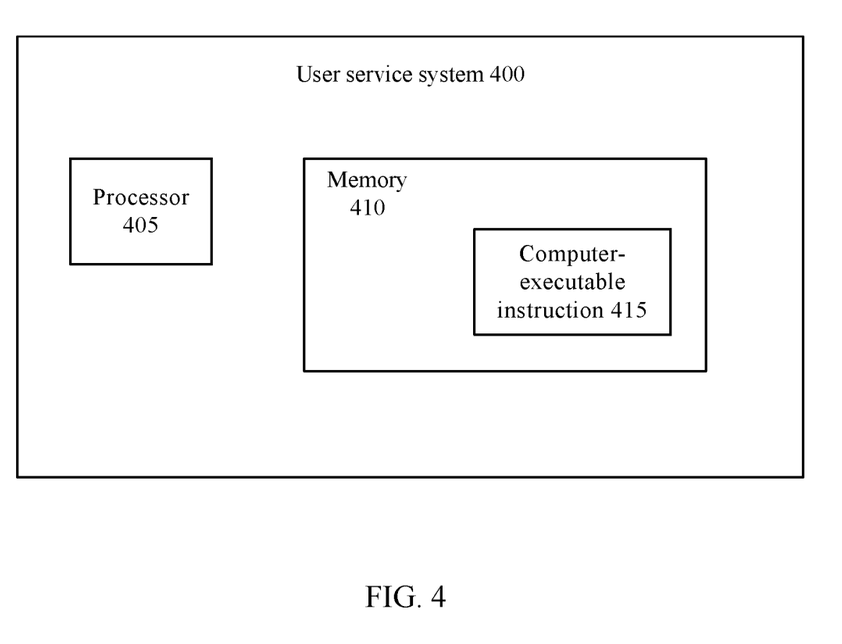
FIG. 4 is a schematic diagram illustrating another example reliable user service system according to various aspects of this specification.

FIG. 4 is a schematic diagram illustrating another example reliable user service system 400 according to aspects of this specification. As shown in the figure, the user service system 400 comprises a processor 405 and a memory 410. The memory 410 stores computer-executable instructions, which when executed by the processor 405, may implement the above-described methods and processes with reference to FIG. 1, FIG. 2, and FIG. 3.

The foregoing implementation manners include reference to the accompanying drawings which constitute a part of the implementation manners. The accompanying drawings show feasible embodiments through the description. These embodiments are also referred to as "examples" in this description. Such examples may comprise elements besides the illustrated or described elements. However, examples comprising the illustrated or described elements are also provided. Moreover, further provided are examples of any combination or arrangement using the illustrated or described elements, given examples (or one or more aspects thereof) with reference to the illustrations or descriptions in this description, or other examples (or one or more aspects thereof) with reference to the illustrations or descriptions in this description.

In the attached claims, the terms "comprise" and "include" are open-ended. In other words, systems, devices, products, or processes of elements other than those listed after such terms in a claim are also considered as falling within the scope of that claim. In addition, in the attached claims, terms such as "first", "second", and "third" are only used for identifying, and are not intended for representing a numerical order of objects they represent.

Moreover, the sequences of the operations illustrated in this description are example. In an alternative embodiment, the operations may be performed in a sequence different from those shown in FIG. 1 and FIG. 2, and the operations may be combined into one operation or split into more operations.

The foregoing descriptions are intended for illustration rather than limiting the specification. For example, the above-described examples (or one or more aspects of the examples) may be used with reference to other examples. For example, a person of ordinary skill in the art may use other embodiments after reviewing the foregoing descriptions. The abstract allows readers to rapidly determine the nature of this technical specification. Submission and interpretation of the abstract will not be intended for explaining or limiting the scope or meanings of the claims. Furthermore, in the foregoing implementation manners, various features may be combined to make this specification smooth. However, the claims may not state each feature disclosed in this description since the embodiments can represent subsets of the feature. In addition, an embodiment may include fewer features than those disclosed in an example. Therefore, the attached claims are integrated into the implementation manners, and one claim exists alone as a separate embodiment. Therefore, the scope of the embodiments disclosed in this description shall be determined with reference to the attached claims and the complete scope of equivalent solutions claimed by such claims.

What is claimed is:

1. A method comprising:
applying, by a processor of a user service system, a hash function to a first data set comprising one or more first user identifiers to generate a first hash value set for the first data set;
encrypting, by the processor, the first hash value set using a first key to obtain an encrypted first hash value set;
sending, by the processor, the encrypted first hash value set without the first key to a data provider;
receiving, by the processor from the data provider, an encrypted second hash value set and a double-encrypted first hash value set;
re-encrypting, by the processor, the received encrypted second hash value set using the first key, and obtaining, by the processor, a double-encrypted second hash value set from the re-encrypting;
calculating, by the processor, an intersection of the double-encrypted first hash value set and the double-encrypted second hash value set;
determining, by the processor, one or more shared users shared between the user service system and the data provider based on the intersection; and
recommending or providing, by the processor, a service to the one or more shared users.

2. The method of claim 1, wherein the encrypted second hash value set is generated by the data provider applying a hash function to a second data set to generate a second hash value set and encrypting the second hash value set using a second key, wherein the second data set comprises one or more second user identifiers.

3. The method of claim 2, wherein the double-encrypted first hash value set is obtained by the data provider encrypting the encrypted first hash value set using the second key.

4. The method of claim 2, wherein the second data set further comprises one or more user-associated second attributes, wherein the recommending or providing, by the processor, a service to the one or more shared users comprises:
requesting, by the processor from the data provider, the one or more second attributes associated with the one or more shared users in the second data set;
after receiving the one or more second attributes associated with the one or more shared users, generating, by the processor, association relationship by associating each of the second attributes with a corresponding user identifier in the first data set; and
recommending or providing, by the processor, a second service to a corresponding user based on the association relationship.

5. The method of claim 4, further comprising, based on the association relationship, recommending, by the processor, a higher-level service with respect to an existing service of the corresponding user to the corresponding user or adjusting the existing service of the corresponding user.

6. The method of claim 2, wherein the one or more shared users correspond to an intersection of the first data set and the second data set, and the method further comprises receiving, by the processor from the data provider, a third data set including the second data set minus the intersection with the first data set.

7. The method of claim 6, wherein the method further comprises recommending or providing, by the processor, a second service to users corresponding to user identifiers of the third data set.

8. The method of claim 6, wherein the method further comprises:
identifying, by the processor, similar users by comparing the third data set with the first data set, wherein the similar users have one or more same attributes in the third data set and the first data set; and
recommending or providing, by the processor, a second service to the similar users in the third data set based on a service of users in the first data set.

9. An apparatus, comprising:
a processor; and
a memory storing computer-executable instructions executable by the processor to cause the processor to perform operations including:
applying a hash function to a first data set comprising one or more first user identifiers to generate a first hash value set for the first data set;
encrypting the first hash value set using a first key to obtain an encrypted first hash value set;
sending the encrypted first hash value set without the first key to a data provider;
receiving, from the data provider, an encrypted second hash value set and a double-encrypted first hash value set;
re-encrypting the received encrypted second hash value set using the first key;
obtaining a double-encrypted second hash value set from the re-encrypting;
calculating an intersection of the double-encrypted first hash value set and the double-encrypted second hash value set;
determining one or more shared users shared with the data provider based on the intersection; and
recommending or providing a service to the one or more shared users.

10. The apparatus of claim 9, wherein the encrypted second hash value set is generated by the data provider applying a hash function to a second data set to generate a second hash value set and encrypting the second hash value set using a second key, wherein the second data set comprises one or more second user identifiers.

11. The apparatus of claim 10, wherein the double-encrypted first hash value set is obtained by the data provider encrypting the encrypted first hash value set using the second key.

12. The apparatus of claim 10, wherein the second data set further comprises one or more user-associated second attributes, wherein the recommending or providing a service to the one or more shared users comprises:

requesting, from the data provider, the one or more second attributes associated with the one or more shared users in the second data set;
after receiving the one or more second attributes associated with the one or more shared users, generating association relationship by associating each of the second attributes with a corresponding user identifier in the first data set; and
recommending or providing a service to a corresponding user based on the association relationship.

13. The apparatus of claim 12, wherein the operations further comprise, based on the association relationship, recommending a higher-level service with respect to an existing service of the corresponding user to the corresponding user or adjusting the existing service of the corresponding user.

14. The apparatus of claim 10, wherein the one or more shared users correspond to an intersection of the first data set and the second data set, and the operations further comprise receiving, from the data provider, a third data set including the second data set minus the intersection with the first data set.

15. The apparatus of claim 14, wherein the operations further comprise recommending or providing a second service to users corresponding to user identifiers of the third data set.

16. The apparatus of claim 14, wherein the operations further comprise:
identifying similar users by comparing the third data set with the first data set, wherein the similar users have one or more same attributes in the third data set and the first data set; and
recommending or providing a second service to the similar users in the third data set based on a service of users in the first data set.

17. A non-transitory computer-readable storage medium storing instructions executable by a processor to cause the processor to perform operations including:
applying a hash function to a first data set comprising one or more first user identifiers to generate a first hash value set for the first data set;
encrypting the first hash value set using a first key to obtain an encrypted first hash value set;
sending the encrypted first hash value set without the first key to a data provider;
receiving, from the data provider, an encrypted second hash value set and a double-encrypted first hash value set;
re-encrypting the received encrypted second hash value set using the first key;
obtaining a double-encrypted second hash value set from the re-encrypting;
calculating an intersection of the double-encrypted first hash value set and the double-encrypted second hash value set;
determining one or more shared users shared with the data provider based on the intersection; and
recommending or providing a service to the one or more shared users.

* * * * *